C. LIEBRICH.
Hasps for Trunk Locks.
No. 5,352. Reissued April 15, 1873.
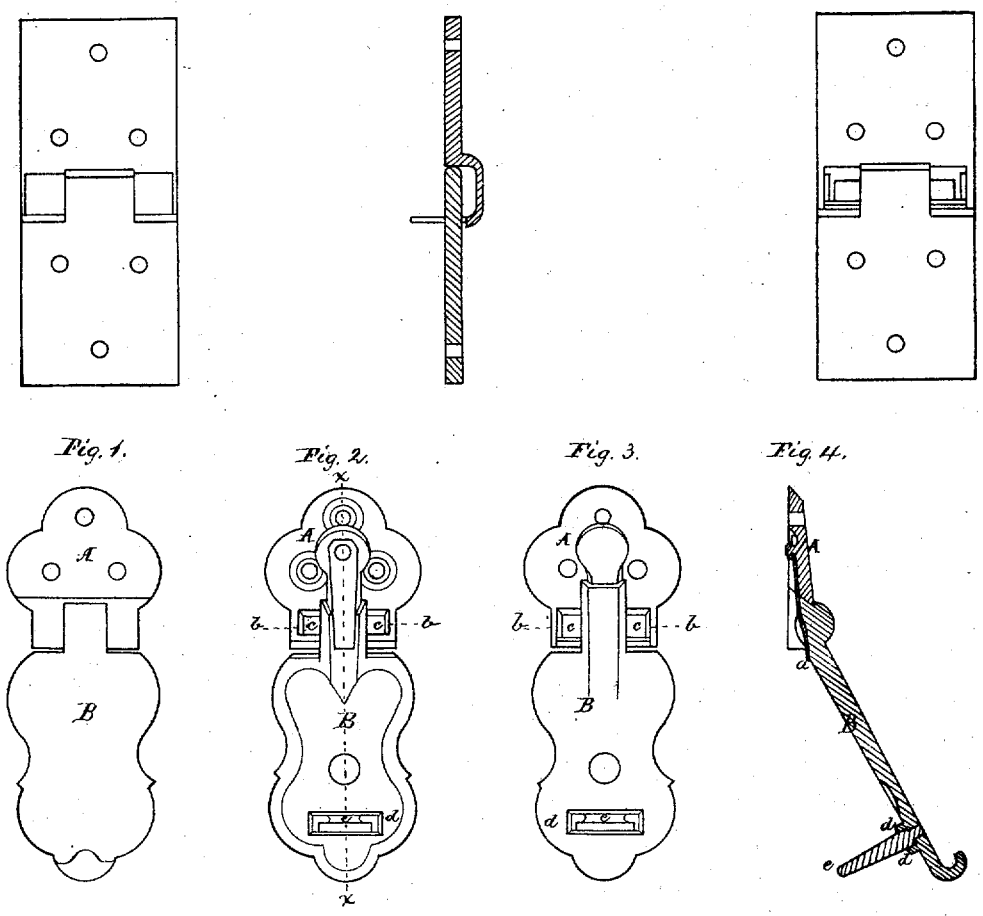
Witnesses:
Jacob E. Schiedt
Millard L. Walton,
Inventor:
Conrad Liebrich.
Louis Hillebrand.
Daniel Wolf.
assignees
by John A. Wiedersheim
Atty.
AM. PHOTO-LITHOGRAPHIC CO. N.Y. (OSBORNE'S PROCESS)

UNITED STATES PATENT OFFICE.

LOUIS HILLEBRAND AND DANIEL WOLF, OF PHILADELPHIA, PENNSYLVANIA, ASSIGNEES OF SAMUEL CROFT AND JOHN C. SCHUELLERMANN, EXECUTORS OF CONRAD LIEBRICH, DECEASED.

IMPROVEMENT IN HASPS FOR TRUNK-LOCKS.

Specification forming part of Letters Patent No. 10,862, dated May 2, 1854; extended seven years; reissue No. 4,170, dated November 1, 1870; reissue No. 5,352, dated April 15, 1873; application filed February 12, 1873.

*To all whom it may concern:*

Be it known that CONRAD LIEBRICH, of the city and county of Philadelphia and State of Pennsylvania, invented new and useful Improvements in Hasps for Trunk-Locks; and the following is hereby declared to be a clear and exact description of the nature thereof, sufficient to enable others skilled in the art to which the invention appertains to fully understand and use the same, reference being had to the accompanying drawing making part of this specification, in which—

Figure 1 is a front view of the device embodying the said invention. Fig. 2 is a rear view thereof. Fig. 3 is a rear view, the spring having been removed. Fig. 4 is a central section in line *x x*, Fig. 2.

Similar letters of reference indicate corresponding parts in the several figures.

It is well known that hasps for trunks have been made with hinges; but in all those heretofore made the hinges were not controlled, and the consequence was that when the lid of the trunk dropped shut the catch of the hasp was liable to strike against the trunk-frame, and frequently break off and cut or damage the trunk. Another objection to the present form of hasps is that the strain or tendency of the lid to open comes entirely upon the catch, which, being slight and riveted to the hasp, is not capable of sustaining any very great force.

This invention has for its object the remedy of the aforesaid serious defects; and consists in the combination, with a hinged trunk-hasp, of a spring attached thereto for operating the lower or hinged portion thereof, whereby, when the hasp is unlocked, said portion will be thrown out and stand in such inclined position as to avoid striking the trunk-frame in letting down the lid and to prevent the hasp-catch from entering the lock until pressed in against the action of the spring. The invention also consists in the combination, with the two parts of a hinged trunk-hasp, of a spring which serves to hold the said parts together and also throw out the lower or movable part. The invention further consists in the combination, with the two parts of a trunk-hasp, of solid trunnions and recesses whereby the hinge or joint of the hasp is protected and greatly strengthened. The invention finally consists in setting the hasp-catch in a solid projection cast with the hasp, which projection enters the lock sufficiently far to receive the strain or tendency of the lid to open, thus taking the force from the catch itself and transferring it to the solid metal, which makes the hasp more substantial and less liable to be forced open.

Referring to the drawing, A B represent the two parts of a hasp, which, for the purpose of lightness, may be cast hollow on the under side. On the upper part of the hasp is attached a spring, *a*, which presses against the lower part so that said lower part will always, unless the hasp is locked, stand as represented in Fig. 4.

It will thus be seen that the hinged portion of the hasp will always stand in such inclined position as to avoid striking the trunk-frame in letting down the lid.

In unlocking it is only necessary to turn the key, and the hasp-catch flies out of the lock itself without manual assistance.

To those who have attempted to hold back the lock-bolt of a spring or a self-locking lock with a key in one hand to draw and hold out the hasp-catch with the other, and then raise the lid of the trunk, the convenience of the spring-hasp will be very obvious.

On the upper part A of the hasp are cast two recesses, *b b*, into which two journals or axes, *c c*, cast or wrought on the lower part B, rest and turn, being held therein by the spring *a*. This, without further fastening, forms the hinge; and, as the spring is on the under side of the hasp and the pivot of the hinge solid or fast to the lower part of the hasp, the hinge or joint cannot be separated without boring clear through the journals from outside to outside. This is important, inasmuch as in ordinary hasps the joint or hinge is a weak point and often successfully assailed by burglars.

In Fig. 4, *g* represents a projection which is cast solid with the part B of the hasp, the catch *e* being riveted in it, as seen in the drawing. This projection *d* enters the lock or escutcheon far enough to catch against the lock-plate and take the strain incident to the rising of the trunk-lid onto the solid metal and relieve the catch *e* from a force which it is not well calculated to withstand.

What is claimed as the invention of CONRAD LIEBRICH (now deceased) is—

1. The combination, with a hinged trunk-hasp, of a spring attached thereto for operating the lower or hinged portion thereof, substantially as described.

2. The combination, with a hinged trunk-hasp, of a spring which is attached to the upper or fixed portion and throws out the lower or movable portion thereof, substantially as described.

3. The combination, with a hinged trunk-hasp, of a spring which serves to hold the parts together and also to throw out the lower or movable portion thereof, substantially as described.

4. The combination, with a hasp, of the solid trunnions *c* and recesses *b*, substantially as and for the purpose described.

5. The hasp-catch secured to a solid projection on the hinged portion of the hasp, substantially as and for the purpose described.

LOUIS HILLEBRAND.
DANIEL WOLF.

Witnesses:
JOHN A. WIEDERSHEIM,
MILLARD F. WALTON.